Dec. 24, 1935.  F. E. STAHL  2,025,555

METHOD OF MAKING A CHAIN LINK

Filed April 9, 1934  2 Sheets-Sheet 1

INVENTOR
FRANK E. STAHL
By J. Wm. Ellis
ATTORNEY

Dec. 24, 1935.  F. E. STAHL  2,025,555
METHOD OF MAKING A CHAIN LINK
Filed April 9, 1934  2 Sheets-Sheet 2

INVENTOR
FRANK E. STAHL
By J. Wm Ellis
ATTORNEY

Patented Dec. 24, 1935

2,025,555

UNITED STATES PATENT OFFICE 2,025,555

METHOD OF MAKING A CHAIN LINK

Frank E. Stahl, Tonawanda, N. Y., assignor to Columbus McKinnon Chain Corporation, Tonawanda, N. Y., a corporation of New York Application April 9, 1934, Serial No. 719,712

8 Claims. (Cl. 219—10)

My invention relates in general to a method of making a chain link, and in particular to a method of forming a blank for such link; welding the ends of the link; and reforming the swell produced at the joint by such welding.

It is well known to those skilled in the art that in the electrical butt welding of chain links of the ordinary form having the usual parallel faced abuting ends, particularly of those made from large size stock, gas pockets are formed in the welded surfaces, with the result that oxidation occurs, or foreign matter is entrapped therein, which weakens the weld. Moreover, in such joints, the abutting surfaces do not contact throughout their entire area, and consequently the portions of the surfaces which first contact many times become heated above the desired temperature before the rest of the surface becomes heated, which often results in burning the metal. This is particularly so when the chain links are formed from high carbon or certain alloy steels, particularly those containing nickel, molybdenum chrome, or manganese. In the use of such steels there is a very limited tolerance as to welding temperature, and the temperature must therefore be kept within narrow limits in order to produce a perfect weld.

It is also well known that when forming joints by means of butt welding, a swell is produced about the welded joint. This swell is very desirable, since it increases the strength of the welded joint to the strength of the stock from which the chain link is made, and in many cases increases the strength thereof over that of the stock. However, on most types of chains, such swell cannot be present on the outside of the links; and, therefore, it is the general practice to remove such swell by pinching, grinding, or cutting, thus losing all of the advantages resulting from the presence of the swell. I have discovered that this swell may be reformed and concentrated on the inside of the link, which gives to the link the desired added strength, and also leaves a smooth, exterior surface.

The principal object of my invention has been to overcome the disadvantages above pointed out and to provide a method of making a chain link whereby the temperature of the weld can be so controlled that high carbon or alloy steels may be used, thus greatly increasing the strength of a chain of any given size, or making it possible to use a smaller size stock for a given strength.

Another object has been to provide a method whereby the welding of the link joint will start at the central area of the abutting surfaces at the joint in the link and work outwardly toward the perimeter thereof.

Moreover, by means of my method, the swell which is formed at the joint during the welding of the same is reformed by being forced inwardly toward the inside of the link, whereby all of the added strength given to the joint by the swell is preserved, and, at the same time, the link is provided with a smooth, exterior surface. Furthermore, by means of my method, I am able to successfully produce chains from high carbon or alloy steels in an economical manner.

The above objects and advantages have been accomplished by the chain blank shown in the accompanying drawings, and the apparatus whereby the method may be carried out. In drawings.

Figure 1:
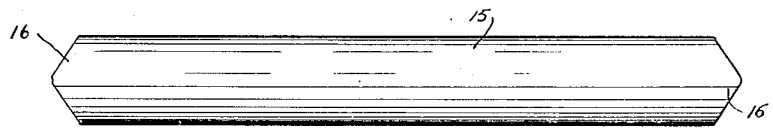
Fig. 1 is a side elevation of a blank formed in accordance with my invention.
Figure 3:
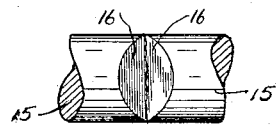
Fig. 3 is a fragmentary top view of the abutting ends before being welded.
Figure 2:
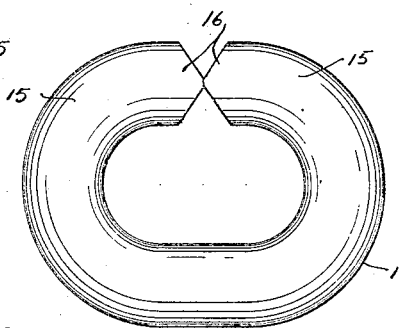
Fig. 2 is a side elevation of an unwelded link formed from the blank with its ends in juxtaposition and ready to be welded.
Figure 4:
Fig. 4 is an end view of one of the ends of the blank.

In the following specification and the appended claims, where I use the terms high carbon and alloy steels, I mean steels having a carbon content of from .07 to .20%, and containing nickel, molybdenum, chrome, or manganese in suitable combinations as, for example, molybdenum nickel, manganese chrome, or chrome nickel. All of the advantages, however, in my method will be found in the use of other alloy combinations, or the use of substitute alloy ingredients.

In the drawings I have shown fragmentary portions, only, of one form of apparatus for carrying out my invention. This abbreviated form of the apparatus is made for clearness of illustration, and since the general form of chain welding apparatus is well known, as illustrated by the structure shown in Patent No. 1,310,554, issued July 22, 1919, to G. J. Armstrong.

As shown in Figs. 1-4, my link blank 15 is formed with ends 16 which are tapered and have a cross-sectional area gradually increasing from the tip or extremity of the end to the full body area of the stock in order that, when abutted, welding may extend progressively from a central area outwardly. The extremity of each tip is so arranged that it lies in a plane which is substantially coincident with the central axis of the ends of the blank. With the provision of such ends, considerable movement must be provided for during the welding operation, for the reason that the gaps between the adjacent inclined surfaces must be closed up and the full size stock brought together in the completed weld. Since the welding operation must not be interrupted during this entire movement; and, since it is necessary that pressure be maintained throughout the period of welding if the weld is to be satisfactory, it is obvious that there must be a follow-up movement of the ends which is substantially proportionate to the heating and softening thereof during welding. I have found that ends suitable for carrying out my invention may be substantially V-shaped. The chisel edges thus formed are made to lie in the same plane, so that when the blank 15 is bent in the form of the link 17, the ends 16 will lie in the same plane and be in juxtaposition with each other, it being preferable that the chisel edges be so arranged with respect to the stock that they will lie in a plane which is substantially coincident with the central axis of the end of the link.

Figure 5:
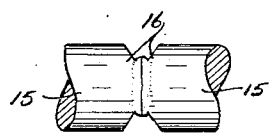
Fig. 5 is a fragmentary side elevation showing the joint in one of the early stages of welding.
Figure 6:
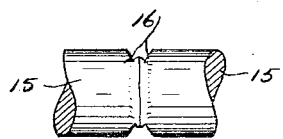
Fig. 6 is a similar view showing the welding of the joint further advanced.

When welding the ends of the blank 15, in accordance with my invention, after the blank has been formed in the link 17, the tips of the ends are brought into contact with each other, and an electric current is made to pass through the joint. Substantially at the same time that the electric current is passed through the tips, pressure is exerted upon the link from opposite sides of the joint so that the ends are kept in continuous contact, and at substantially the same constant pressure. The relatively small area of the metal abutting at the first contact of the tips instantly reaches welding heat. After the initial heating, the flow of electricity is maintained and the heat continues to travel back uniformly from each side of the tips at welding temperature; and, as it does so the ends of the link are forced together proportionately to the travel of the heat, so that substantially the same degree of pressure is maintained upon the welded joint throughout the process of welding. As the heating continues, and the pressure follows up the continuously closing joint, the welding area will increase substantially uniformly from a central or axial plane outwardly toward the perimeters of the ends of the blank, as clearly shown in Figs. 5 and 6, and will spread outwardly toward the outer perimeter of the material forming the link. The flow of electricity is maintained, and the pressure is caused to follow up the ends as they are merging together in the process of welding, until the welding surface reaches an area substantially equal to the area of the stock and until the ends have been forced together sufficiently to completely weld the joint over the entire area of the stock. When welding a joint having chisel-shaped ends, the metal in the joint at the sides of the link, being in initial contact, will be extruded beyond the side surfaces of the link stock from the beginning of the weld; and such extrusion will continue to occur at opposite sides of the joint being welded due to the progressive advancing of the ends until they have been brought together far enough to close the gaps in the joint, or until the welded surface has reached the outside diameter of the stock at the top and bottom of the link. Any further movement of the ends will produce some extrusion at the top and bottom also, and a swell is thus preferably formed all around the welded joint as shown in Fig. 7.

In present day practice, as is well known, some initial pressure is, of course, exerted upon the ends of the joints to be welded so as to prevent the metal from spluttering out and to maintain electrical contact between the ends when the current is first applied. This application of initial pressure is, however, wholly unsuitable for carrying out my process, since, as just above pointed out, there is considerable space at the ends between the points where the bases of the inclined surfaces forming the V-shaped ends join the outer and inner perimeters of the link when the ends are first brought together and the pressure exerted upon the abutting ends of my blank must follow up the ends of the link to close up this space and to compensate for the shortening ends during the process of welding. If the pressure were applied only at the beginning of the weld, as in the well known process of butt welding joints having parallel faces, this pressure would be substantially released during the first part of my method, due to the fact that the metal in the ends has become soft and molten under the influence of the welding heat; and, unless the pressure is maintained by a follow-up movement of the ends, the molten metal will fall away from the contacting areas and out from between the adjacent ends of the link, thus breaking the electrical contact and making it impossible to complete the weld. In carrying out my method, it is therefore necessary that sufficient pressure be applied at the beginning when the electric current is first made to pass through the reduced area at the joint, and that this pressure be maintained throughout the welding operation as the ends are moved toward each other, because of the continuously increasing area of the welded surfaces, and the consequent shortening of the link ends.

Figure 7:
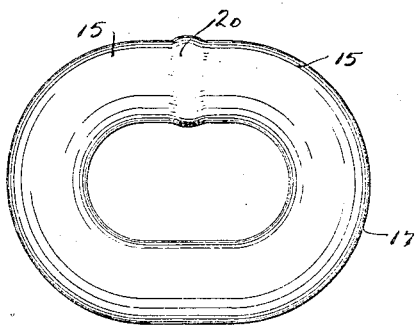
Fig. 7 is a side elevation of the link completely welded, and showing the formation of the swell.

After the ends have been gradually forced together under the pressure conditions just above described, and the weld completed, as shown in Fig. 7, the flow of electricity is interrupted. The pressure, however, upon the ends is maintained until the weld in the joint has completely set. The current is then allowed to pass through the welded joint interruptedly at short durations in order to maintain the heat in the joint at proper temperature for subsequent treatment. With the metal at the joint at proper forging temperature, the swell 20, as shown in Fig. 7, is reformed by having the metal therein forced inwardly toward the inside of the link in a line substantially at right angles to the longitudinal axis of the link, whereby the exterior of the link is made substantially smooth, and a reformed swell 21 is produced (see Figs. 8 and 12). During the reformation of the swell, a small tab 22 may be formed on the outside of the link by the dies, to be hereinafter described, but this tab does not interfere with the operation of the chain, and is substantially removed in the subsequent process of tumbling the links.

Figure 9:
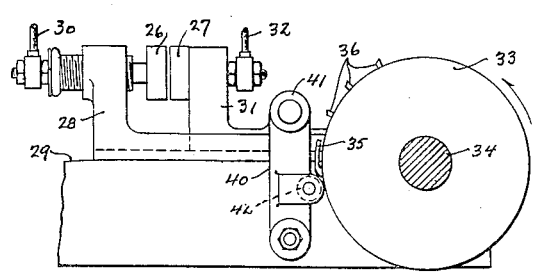
Fig. 9 is a fragmentary side elevation of suitable means for controlling the flow of electricity to the welding electrodes.

Reference is now to be had to Figs. 9 to 12 inclusive, where I show fragmentary portions of an apparatus suitable for carrying out my method. In Fig. 9 I show suitable electric contact means for causing the flow of electric current to the electrodes 25, shown in Figs. 11 and 12, to be hereinafter described, which comprises a stationary switch contact 26 and a movable switch contact 27. The stationary contact is carried by a bracket 28, rigidly mounted upon the housing 29 of the machine. This stationary contact is adjustable, in well known manner, and carries an electric conductor 30. The movable switch contact 27 is carried by a bracket 31, which is slidably mounted in the bracket 28. The other electric conductor 32 is carried by the movable switch contact. A control disk 33 is suitably mounted upon a shaft 34, carried by the housing 29, and this control disk has a contact arm 35 and contact pins 36. The shaft 34, carrying the disk, is designed to have timed rotation with the other parts of the machine, so that it works in synchronism with the pusher cams 37, (Fig. 10), to be hereinafter described. An operating arm 40 is pivotally carried by the base 29 of the machine and has its upper end 41 pivotally attached to the bracket 31 of the movable switch contact. A roller 42 is carried by the operating arm at a point near the lower end and in such position that it will be engaged by the contact arm 35 and contact pins 36 of the control disk. When the disk is rotated in the direction indicated by the arrow, the contact arm will first be brought into engagement with the roller, which will cause the bracket 31 to be moved along on the bracket 28, thus bringing the movable switch contact 27 into engagement with the stationary switch contact 26. The current will thus flow through the electrodes 25 and thence through the joint of the link during the time the contact arm 35 is in engagement with the roller. The contact pins 36 also cause the switch contacts to close the circuit, but these pins hold the contacts closed only momentarily, and because there are a number of them, the current is intermittently applied to the joint of the link.

Figure 10:
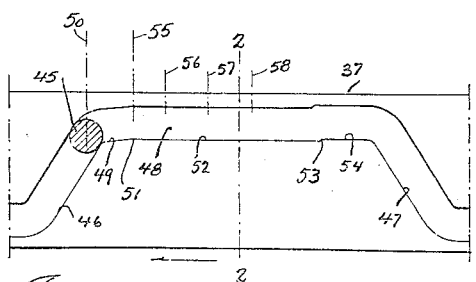
Fig. 10 shows a diagrammatical layout of a pusher cam to be used in carrying on my method.

In Fig. 10 I show in diagrammatical manner a cam layout suitable for operating the ordinary pusher (not shown) of a chain welding machine. In this figure the line 2—2 indicates the axis of rotation of the cam and the direction of rotation is indicated by the arrow. The roller engaging with the cam is represented at 45. As is well known, the purpose of the pushers of a chain welding machine is to force the surfaces at the joint of the link together. A cam is usually employed for actuating each of the pushers to so force the ends of the link together and to withdraw the pushers when the weld is completed. Each of the cams 37, diagrammatically shown in Fig. 10, suitable for carrying out my invention, has the usual inclined surfaces 46 and 47, which, of course, are joined together at their lower ends in the complete cam and these inclined surfaces, as is well known, serve to move the pushers into and out of operative engagement with the chain link. Connecting the inclined surfaces 46 and 47 of the cam is the operating surface 48, which is brought into use during the welding operation. This surface comprises a gradually inclined surface portion 49, which starts to operate upon the roller 45 when the point indicated by the dot and dash line 50 reaches the axis of the roller. This surface portion extends from the upper end of the inclined surface portion 46 and terminates at a point 51, where it joins a surface portion 52. This portion is known as a "dwell", and serves to hold the roller 45 in substantially the same position axially of the cam during its engagement with such surface, so that the pusher actuated by the roller 45 is maintained in the same position while in contact with such surface 52. The surface portion 52 extends to the point 53 and at this point there is a slight rise in the cam above the surface portion 52 to the level of a surface portion 54. The surface portion 54 terminates at the upper end of the inclined surface portion 47. Substantially coincident with the point 51, I have shown a dot and dash line 55, which indicates the point in the rotation of the cam where the welding current supplied to the link joint through the electrodes 25 is interrupted. The contact cam 35 is therefore made of such proportions that the current, which is first applied for welding at the point in the travel of the cam, indicated by line 50, is continued during the entire welding period, or until the point indicated by line 55 in the travel of the cam reaches the roller 45, at which time sufficient heat has been applied to the joint to bring about a complete weld. No further current is applied to the link blank until the point represented by the dot and dash line 56 reaches the roller. Dot and dash lines 57 and 58 are also shown at intervals along the surface portion 52 of the cam. These lines indicate the points in the rotation of the cam at which current is applied to the link joint by the engagement of the contact pins 36 of the cam 33 with the roller 42 of the switch mechanism. As hereinbefore pointed out, the application of current at points 56, 57 and 58 is intermittent and momentary and is for the purpose of maintaining proper temperature in the welded joint for the subsequent reforming of the swell or bulge 20 formed during the welding period. Pressure is, of course, being maintained upon the joint during the period when the roller 45 is traveling over the surface portion 52, during which time the weld is setting and the joint is receiving its intermittent application of current. Such pressure may be made sufficient for the final reforming of the swell 20, but in some cases it is preferable to slightly increase the pressure upon the joint during the reforming of the swell, and this may be accomplished by means of the slight rise in the cam caused by the surface portion 54. Obviously, when the end of the surface portion 54 reaches the roller 45, it will be moved down the inclined surface portion 47 and the pushers will be moved, in well known manner, away from the link just acted upon, and another link moved into operative position by suitable mechanism common and well known in chain welding machines, and not, therefore, further shown or described in this application.

Figure 8:
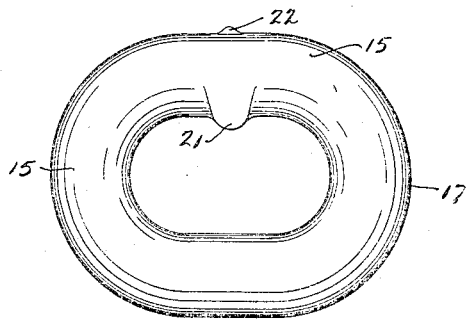
Fig. 8 is a similar view of the link after the swell has been reformed.
Figure 11:
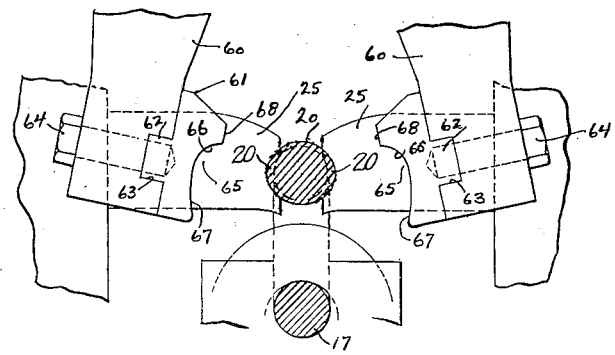
Fig. 11 is a fragmentary elevation of one form of apparatus for connecting a source of electric current to the link at the joint and for reforming the swell.
Figure 12:
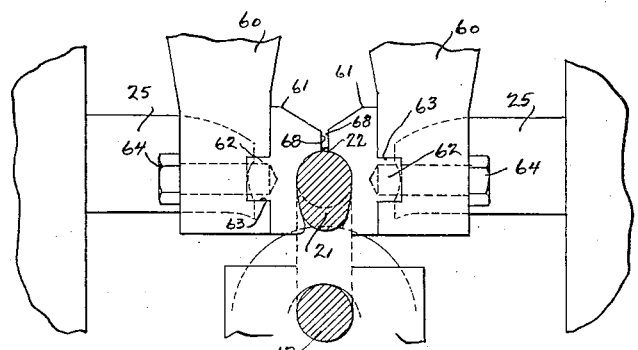
Fig. 12 is a similar view of parts of the same apparatus in different positions.

In the reforming of the swell 20, after the joint has been welded, some suitable squeezing mechanism must be employed. In Figs. 11 and 12 I have shown in a fragmentary manner one form of such mechanism. As here shown, two oppositely arranged rocker arms 60 are provided, which are suitably mounted for oscillation toward each other and are actuated by any suitable toggle means (not shown). At the bottom of each of these arms there is provided a swell-reforming anvil 61. Each of these anvils is preferably provided with a projection 62, which extends into a recess 63 formed in each rocker arm 60. A bolt 64 may be employed to hold the anvils in position. Each of these anvils is provided with a working face 65, having its upper portion 66 of a radius substantially the same as the radius of the stock forming the link, so that the metal in the swell at the welded joint, with which this surface first contacts, will be reformed by being forced inwardly, thus leaving the surface of the link, with which this portion engages, of substantially the same radius as the radius of the stock from which the link is made. Joining this upper surface portion 66 is a surface portion 67 of larger radius, so that when the anvils are brought together, as shown in Fig. 12, there will be provided some space into which the material of the swell 20 may be forced. By this formation, the anvil surfaces 66 will initially contact with the metal of the swell on each side of the joint substantially at points where the extrusion is greatest. After this initial contact, the surface portions 66 and 67 will permanently contact with the metal of the joint and force the metal from around the top and side surfaces of the link at the joint and displace it inwardly toward the inside surface of the joint from which it protrudes, as shown in Figs. 8 and 12, in the shape of a reformed swell 21. Extending upwardly from the upper termination of the upper surface portion 66 is a flat surface 68. It is preferable that these surfaces 68 of the anvils do not completely close when the rocker arms have moved the anvils to their closed positions, for the reason that all of the metal cannot be completely removed from the outer part of the swell of the link joint, which results in a small tab 22 being formed. This tab is subsequently removed preferably by tumbling. The material which is removed by the removal of the tab 22 is not sufficient to in any wise affect the strength of the finished joint.

The welding electrodes 25, hereinbefore referred to, are also clearly shown in Figs. 11 and 12. Only one set of such electrodes are shown as contacting with opposite sides of the link but it is obvious that two pairs of such electrodes are employed, one pair on each side of the joint with the current flowing through the joint from one pair to the other. These pairs of electrodes are, therefore, in interspaced arrangement, and it is desirable to have the anvils 61 arranged between the pairs of electrodes, whereby the anvils may be brought into operative relation with the link slightly before or immediately at the time the electrodes are being withdrawn from such engagement. In Fig. 11 the electrodes are shown in engagement, and the link joint as being completed and the swell 20 being formed. From this time on, dring the process of the making of my link, the current is intermittently applied, as hereinbefore described, and when the weld has set and the metal in the swell is at the proper forging temperature, the anvils 61 are brought into action to reform the swell 20 into the reformed swell 21, as clearly shown in Fig. 12. The electrodes 25 are shown in this figure as being drawn out of engagement.

It is obvious that the movement of the electrodes is brought about in synchronized relationship to the movement of the control cam and contact switch, and furthermore that the anvils are actuated also in timed relation with the other parts of the device. Such actuating means are common in chain link welding machinery, and, since they do not form part of my invention, they are not further shown or described.

Obviously, when the swell is reformed, as shown in Fig. 12, the anvils are separated and another link is brought into operative position, whereupon the electrodes 25 are moved into operative contact with the links and pressure is applied by means of the pushers (not shown) as heat is applied by the flow of electricity through the joint.

Having thus described my invention, what I claim is:

1. A method of making a chain link, comprising the formation of a link blank having a tip at each of its ends formed with a substantially diametrically arranged chisel shaped edge, bringing the chisel edges together in juxtaposition, having the edges lying in the same plane by forming the blank into a link, applying pressure to the contacting ends at the joint, simultaneously passing electric current through the ends at the joint, maintaining substantially constant pressure upon the coacting ends while they are being moved toward each other throughout the welding period, whereby a swell is formed at the joint, then continuing the application of heating current, whereby a forging temperature is maintained upon the joint, and then reforming such swell by displacing substantially all metal in the swell at the joint and forcing it inwardly so as to form a permanent reinforcing swell on the inside of the link.

2. A method of making a chain link, comprising the formation of a link blank having a tip at each of its ends formed with a chisel edge, bringing the chisel edges together in juxtaposition, having the edges lying in the same plane by forming the blank into a link, applying pressure to the contacting ends at the joint, simultaneously passing electric current through the ends at the joint, maintaining substantially constant pressure upon the coacting ends while they are being moved toward each other throughout the welding period, whereby a swell is formed at the joint, then continuing the application of heating current, whereby a forging temperature is maintained upon the joint, and then reforming such swell by displacing substantially all of the metal in the swell at the joint and forcing it inwardly so as to form a permanent reinforcing swell on the inside of the link by the application of pressure from opposite sides of the welded joint and at right angles to the desired direction of flow of the displaced metal.

3. A method of making a chain link, comprising the formation of a link blank having a tip formed on each of its ends, such tip having a cross-sectional area gradually increasing from the extremity thereof to the full body area of the stock, bringing the tips in contact with each other, applying pressure to the tips to force them toward each other, then simultaneously passing an electric current through the abutting ends, then maintaining substantially constant pressure upon the abutting surfaces throughout the period of welding, whereby a swell is formed at the joint, then maintaining pressure upon the joint until the weld has set, then continuing the application of heating current, whereby a forging temperature is maintained upon the joint, and then reforming said swell by displacing substantially all of the metal in the swell at the joint and forcing it inwardly so as to form a permanent reinforcing swell on the inside of the link by the application of pressure from opposite sides of the welded joint and at right angles to the desired direction of flow of the displaced metal.

4. A method of making a chain link, comprising the formation of a link blank having a tip formed on each of its ends, such tip having a cross-sectional area gradually increasing from the extremity thereof to the full body area of the stock, bringing the tips in contact with each other, applying pressure to the tips to force them toward each other, then simultaneously passing an electric current through the abutting ends, then maintaining substantially constant pressure upon the abutting surfaces throughout the period of welding, whereby a swell is formed at the joint, then maintaining pressure upon the joint until the weld has set, then continuing the application of heating current, whereby a forging temperature is maintained upon the joint, then reforming said swell by displacing substantially all of the metal in the swell at the joint and forcing it inwardly so as to form a permanent reinforcing swell on the inside of the link by the application of pressure from opposite sides of the welded joint and at right angles to the desired direction of flow of the displaced metal, and simultaneously forming a substantially smooth exterior surface at the joint.

5. A method of making chain links, comprising the formation of a link blank having a tip at each of its ends so formed that the cross-sectional area of each gradually increases from the extremity thereof to the full body area of the link, bringing the tip of each end in contact with the tip of the other end by forming the blank into a link, then subjecting the contacting ends to welding heat and pressure, then subjecting the contacting ends to substantially uniform pressure throughout the welding period while maintaining the welding heat, whereby a swell is formed, then maintaining pressure until the weld has set, then maintaining a forging heat upon the joint, and then reforming such swell by displacing substantially all of the metal in the swell at the joint and forcing it inwardly so as to form a permanent reinforcing swell on the inside of the link by the initial application of pressure from opposite sides of the welded joint on the outer periphery of the link and by progressively advancing such pressure upon the periphery of the welded joint.

6. A method of making chain links, comprising the formation of a link blank having a tip at each of its ends so formed that the cross-sectional area of each gradually increases from the extremity thereof to the full body area of the link, bringing the tip of each end in contact with the tip of the other end by forming the blank into a link, then subjecting the contacting ends to welding heat and pressure, then subjecting the contacting ends to substantially uniform pressure throughout the welding period while maintaining the welding heat, whereby a swell is formed, then maintaining pressure until the weld has set, then maintaining a forging heat upon the joint, then reforming such swell by displacing substantially all of the metal in the swell at the joint and forcing it inwardly so as to form a permanent reinforcing swell on the inside of the link by the initial application of pressure from opposite sides of the welded joint on the outer periphery of the link and by progressively advancing such pressure upon the periphery of the welded joint, and simultaneously so forming the periphery of the welded joint that it is of substantially the same cross-sectional shape as the link stock except where the reinforcing swell is formed.

7. A method of making a chain link, comprising the formation of a link blank having a tip on each of its ends, each of such tips having an abutting surface lying in a plane substantially coincident with the central axis of the blank, each of such tips having a cross-sectional area gradually increasing from the extremity thereof to the full body area of the stock, bringing the abutting surfaces of the tips in contact with each other, applying pressure to the tips to force them toward each other, simultaneously applying an electric current across the centrally disposed, abutting surfaces, whereby welding of the tips will start across such abutting surfaces, continuing the application of current, maintaining the pressure by progressively advancing the ends toward each other an amount which is substantially in direct proportion to the melting of the metal in the tips, whereby the welding is continued in opposite directions from the central area outwardly toward the perimeter of the blank until the joint has reached the desired welded area and a swell has been formed, and then reforming the swell by forcing substantially all the surplus metal inwardly toward the inside of the link.

8. A method of making a chain link, comprising the formation of a link blank having a tip on each of its ends, each of such tips having an abutting surface lying in a plane substantially coincident with the central axis of the blank, each of such tips having a cross-sectional area gradually increasing from the extremity thereof to the full body area of the stock, bringing the abutting surfaces of the tips in contact with each other, applying pressure to the tips to force them toward each other, simultaneously applying an electric current across the centrally disposed, abutting surfaces, whereby welding of the tips will start across such abutting surfaces, continuing the application of current, maintaining the pressure by progressively advancing the ends toward each other an amount which is substantially in direct proportion to the melting of the metal in the tips, whereby the welding is continued in opposite directions from the central area outwardly toward the perimeter of the blank until the joint has reached the desired welded area and a swell has been formed, then continuing the application of electric current, whereby a forging temperature is maintained upon the joint, and then reforming the swell by forcing substantially all the surplus metal inwardly toward the inside of the link.

FRANK E. STAHL.